United States Patent
Ishibashi et al.

(10) Patent No.: US 12,319,280 B2
(45) Date of Patent: Jun. 3, 2025

(54) VEHICLE CONTROL DEVICE, SYSTEM, AND VEHICLE CONTROL METHOD

(71) Applicant: Panasonic Intellectual Property Management Co., Ltd., Osaka (JP)

(72) Inventors: Yuya Ishibashi, Kanagawa (JP); Teppei Shibata, Kanagawa (JP); Toru Ichikawa, Tokyo (JP)

(73) Assignee: Panasonic Automotive Systems Co., Ltd., Kanagawa (JP)

( * ) Notice: Subject to any disclaimer, the term of this patent is extended or adjusted under 35 U.S.C. 154(b) by 183 days.

(21) Appl. No.: 18/161,563

(22) Filed: Jan. 30, 2023

(65) Prior Publication Data

US 2023/0322217 A1  Oct. 12, 2023

(30) Foreign Application Priority Data

Mar. 28, 2022 (JP) ................. 2022-051218

(51) Int. Cl.
*B60W 30/095* (2012.01)
*B60W 30/09* (2012.01)
*G01S 15/931* (2020.01)

(52) U.S. Cl.
CPC ........ *B60W 30/0956* (2013.01); *B60W 30/09* (2013.01); *G01S 15/931* (2013.01); *B60W 2420/54* (2013.01); *B60W 2554/80* (2020.02)

(58) Field of Classification Search
CPC ............. B60W 30/0956; B60W 30/09; B60W 2420/54; B60W 2554/80; G01S 15/931
USPC ........................................................ 701/301
See application file for complete search history.

(56) References Cited

U.S. PATENT DOCUMENTS

| 11,628,857 | B2* | 4/2023 | Bariant ................ G05D 1/0274 701/25 |
| 2015/0219760 | A1* | 8/2015 | Hiramaki ........... B62D 15/0285 367/99 |
| 2016/0236660 | A1* | 8/2016 | Jung ......................... B60T 7/22 |
| 2019/0004143 | A1* | 1/2019 | Mishima ............... G01S 15/931 |
| 2021/0302591 | A1* | 9/2021 | Kawakami ............ B60Q 9/008 |
| 2022/0003864 | A1* | 1/2022 | Nose ..................... G01S 7/4808 |
| 2022/0082689 | A1* | 3/2022 | Kim ....................... G01S 15/46 |

(Continued)

FOREIGN PATENT DOCUMENTS

| JP | 2008242795 A | 10/2008 |
| JP | 2018081050 A | 5/2018 |

*Primary Examiner* — Krishnan Ramesh
(74) *Attorney, Agent, or Firm* — Seed IP Law Group LLP

(57) ABSTRACT

A vehicle control device is disclosed. The vehicle control device controls a vehicle on the basis of one or more detection times each representing a distance measured by a distance measuring device mounted on the vehicle. The distance measuring device measures a distance to an object around the vehicle by transmitting and receiving sound waves. The vehicle control device includes acquisition circuitry and estimated coordinate calculation circuitry. The acquisition circuitry acquires the one or more detection times. The estimated coordinate calculation circuitry calculates estimated coordinates indicating an estimated position of an object in a case where the object is present in a neighborhood of the distance measuring device but a distance to the object is not measured. The estimated coordinates is calculated on the basis of the one or more detection times having been acquired by the acquisition circuitry.

13 Claims, 22 Drawing Sheets

(56) References Cited

U.S. PATENT DOCUMENTS

2023/0075008 A1\* 3/2023 Cooper ................ G01S 5/0278
2023/0168374 A1\* 6/2023 Kim ..................... G01S 15/931
                                                            367/99

\* cited by examiner

VEHICLE CONTROL DEVICE, SYSTEM, AND VEHICLE CONTROL METHOD

CROSS-REFERENCE TO RELATED APPLICATIONS

This application is based upon and claims the benefit of priority from Japanese Patent Application No. 2022-051218, filed on Mar. 28, 2022, the entire contents of which are incorporated herein by reference.

FIELD

The present disclosure relates generally to a vehicle control device, a system, and a vehicle control method.

BACKGROUND

There is a conventional technique for controlling a vehicle (typically, control of operating a brake) in order to avoid a collision with an object on the basis of a result of object detection performed by a distance measuring device such as sonar mounted on the vehicle (for example, JP P2018-081050A).

In the conventional technique, in a region in the neighborhood of the distance measuring device, it is possible to determine the possibility that an object is present. However, it is difficult to measure a distance to the object present in such a region. Therefore, it is difficult to identify the position of the object in the region in the neighborhood of the distance measuring device, and thus there is a possibility that collision determination accuracy deteriorates.

SUMMARY

A vehicle control device according to the present disclosure controls a vehicle on the basis of one or more detection times each representing a distance measured by a distance measuring device mounted on the vehicle. The distance measuring device serves to measure a distance to an object around the vehicle by transmitting and receiving sound waves. The vehicle control device includes acquisition circuitry and estimated coordinate calculation circuitry. The acquisition circuitry is configured to acquire the one or more detection times. The estimated coordinate calculation circuitry is configured to calculate estimated coordinates indicating an estimated position of an object in a case where the object is present in a neighborhood of the distance measuring device but a distance to the object is not measured. The estimated coordinates is calculated on the basis of the one or more detection times having been acquired by the acquisition circuitry.

DETAILED DESCRIPTION

A vehicle control device, a system, and a vehicle control method according to embodiments of the present disclosure will be described below in detail with reference to the accompanying drawings.

Figure 1:
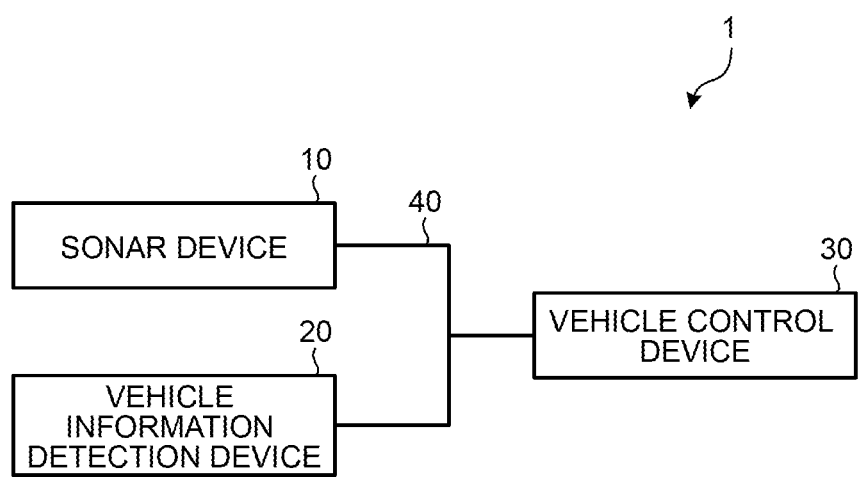
FIG. 1 is a diagram illustrating an example of a schematic configuration of a vehicle control system according to an embodiment.

A schematic configuration of a vehicle control system 1, which is mounted on a vehicle, according to the present embodiment will be described with reference to FIG. 1. The vehicle control system 1 is an example of a "system". As illustrated in FIG. 1, the vehicle control system 1 includes a sonar device 10, a vehicle information detection device 20, and a vehicle control device 30. These devices are connected to each other over a network 40 such as a controller area network (CAN), for example. Note that the type and number of devices included in the vehicle control system 1 are not limited to those in the example of FIG. 1, and other devices may be included. For example, the vehicle control system 1 may include an HMI device including a display capable of displaying information.

The sonar device 10 is an example of a "distance measuring device". The sonar device 10 is a device that is mounted on a vehicle and capable of measuring a detection time (flying time) representing a distance to an object around the vehicle by transmitting and receiving sound waves (for example, ultrasound waves). The vehicle information detection device 20 is a device that detects vehicle information such as a vehicle speed and a moving amount (an amount indicating a moving distance and a moving direction) of the vehicle. The vehicle control device 30 is a device that calculates distance information by using the detection time measured by the sonar device 10 and controls the vehicle on the basis of the vehicle information detected by the vehicle information detection device 20. Note that, in the present embodiment, the sonar device 10 measures the detection time, whereas the embodiment is not limited thereto. For example, the vehicle control device 30 may measure the detection time.

Figure 2:
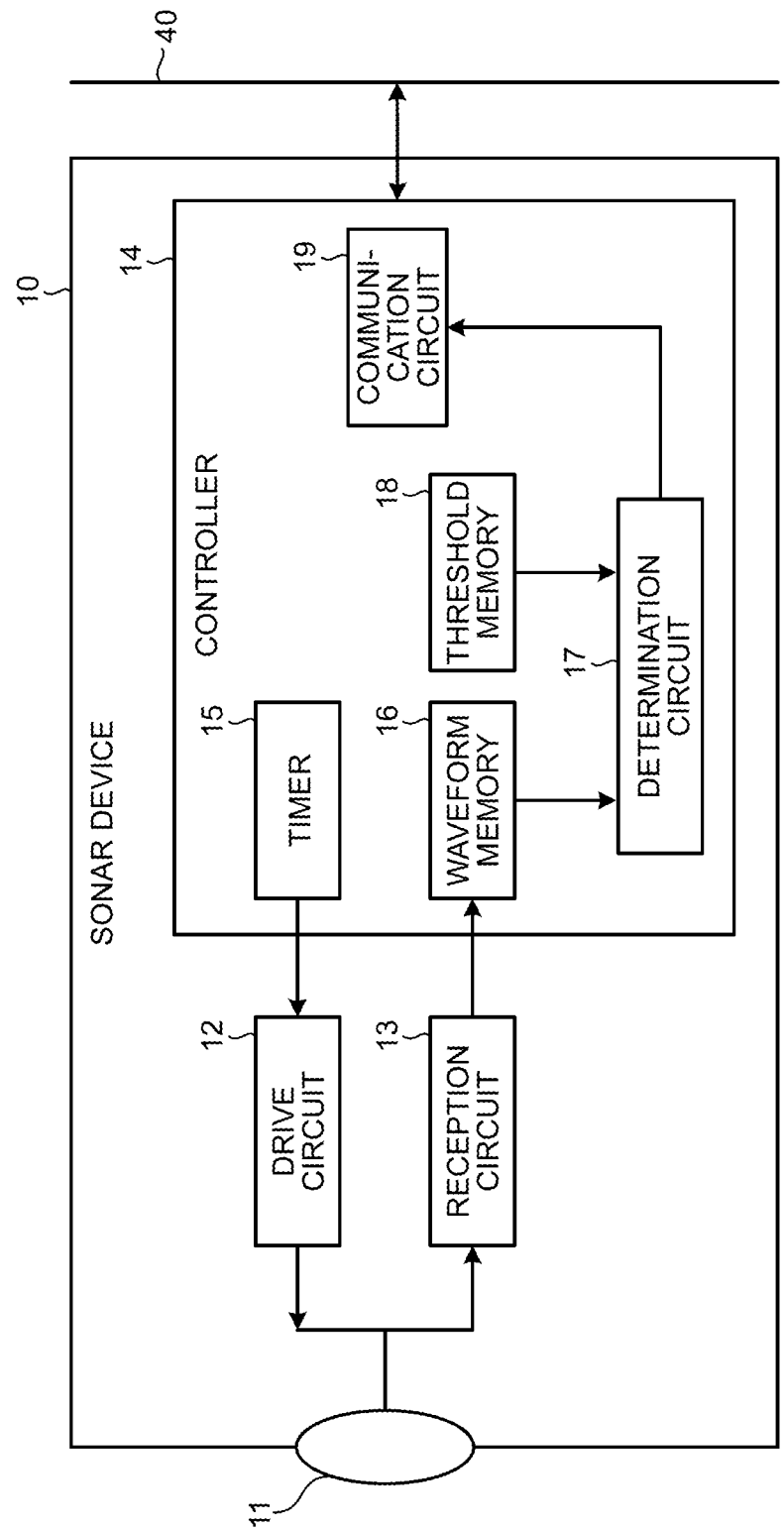
FIG. 2 is a diagram illustrating an example of a hardware configuration of a sonar device according to the embodiment.

Next, a specific configuration of the sonar device 10 will be described. As illustrated in FIG. 2, the sonar device 10 includes a piezoelectric element 11, a drive circuit 12, a reception circuit 13, and a controller 14. Under the control of the controller 14, the piezoelectric element 11 oscillates an ultrasound wave by converting the drive voltage applied by the drive circuit 12 into a sound pressure and outputting the sound pressure. The ultrasound wave oscillated by the piezoelectric element 11 is reflected by striking an object (a road surface, an obstacle, or the like) around the vehicle. Then, part of the ultrasound wave returns to the sonar device 10 (the piezoelectric element 11). The reception circuit 13 can convert the sound pressure oscillated by the piezoelectric element 11 into a voltage and generate an echo waveform indicating a temporal change in the voltage corresponding to the sound pressure oscillated by the piezoelectric element 11.

The controller 14 is capable of controlling the drive circuit 12, detecting an object around the vehicle on the basis of the echo waveform generated by the reception circuit 13, and generating a detection time of the detected object. The controller 14 of the present embodiment is also capable of generating, on the basis of the echo waveform, a near flag indicating a state that an object is present in the neighborhood of the sonar device 10 but the distance to the object is not measured. A specific configuration of the controller 14 will be described below.

As illustrated in FIG. 2, the controller 14 includes a timer 15 for defining a drive timing (a timing at which a drive voltage is applied) of the drive circuit 12, a waveform memory 16 for storing an echo waveform, a determination circuit 17, a threshold memory 18 for storing a threshold, and a communication circuit 19 for communicating with the network 40.

Figure 3:
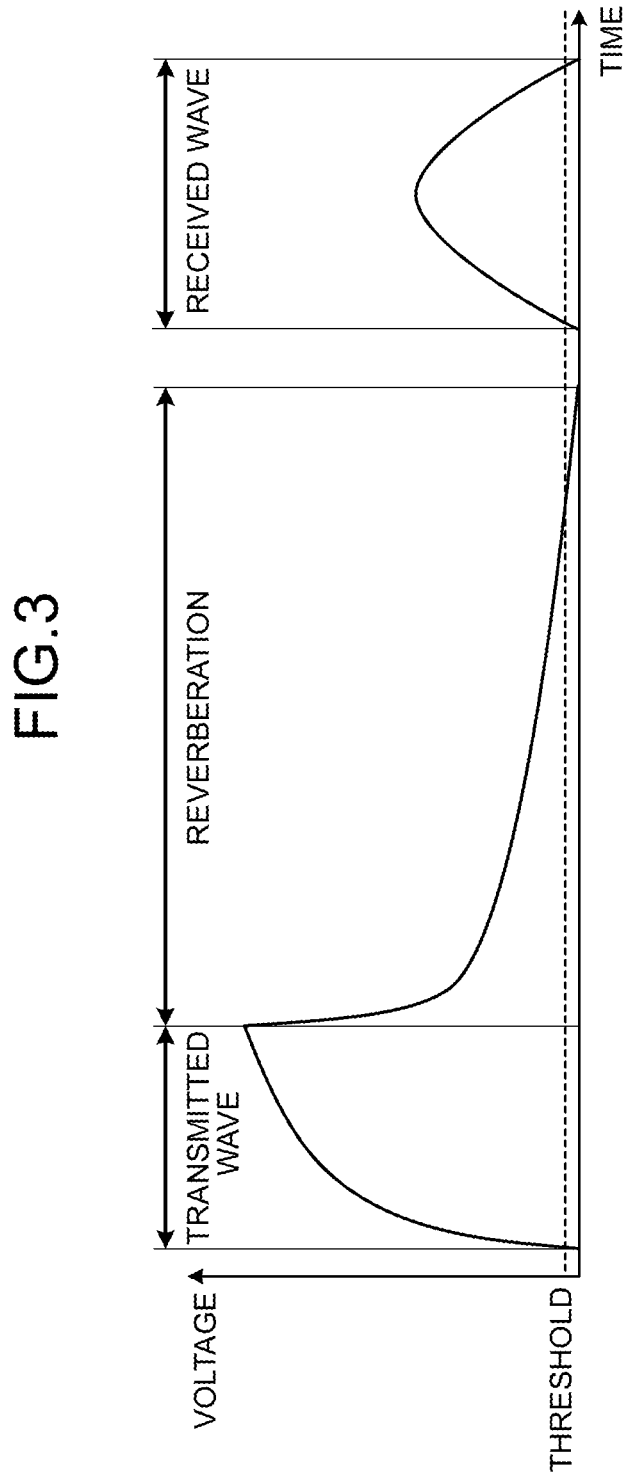
FIG. 3 is a diagram for explaining object detection and generation of a detection time by the sonar device according to the embodiment.

The determination circuit 17 is capable of detecting an object present around the vehicle and generating a detection time by comparing the echo waveform with a threshold (threshold for object detection) stored in the threshold memory 18. As illustrated in FIG. 3, a time period after transmitting the ultrasound wave until the vibration of the piezoelectric element 11 stops is referred to as reverberation (reverberation period). When the received wave (reflected and returned ultrasound wave) exceeds a threshold after the reverberation falls below the threshold, the determination circuit 17 can generate a detection time by detecting an object around the vehicle and measuring a time from the transmission of wave to the reception of wave. In a case where the object around the vehicle is detected and the detection time can be generated, the determination circuit 17 transmits the generated detection time to the communication circuit 19. The communication circuit 19 transmits the detection of the object around the vehicle and the detection time to the vehicle control device 30 via the network 40.

Next, a method of generating a near flag by the determination circuit 17 will now be described. Prior to the description of a near flag generation method, the behavior of reverberation will be described. The reverberation may appear to become longer than usual in a case (1) where a foreign substance is attached to the piezoelectric element 11 or a case (2) where an object is present in the neighborhood of the piezoelectric element 11 (sonar device 10). When the reverberation becomes longer than the normal period (which is determined by using, for example, a threshold or others indicating the normal period), the cases (1) and (2) are identified, and a near flag is generated when the reverberation is determined to be the case (2).

Figure 4:
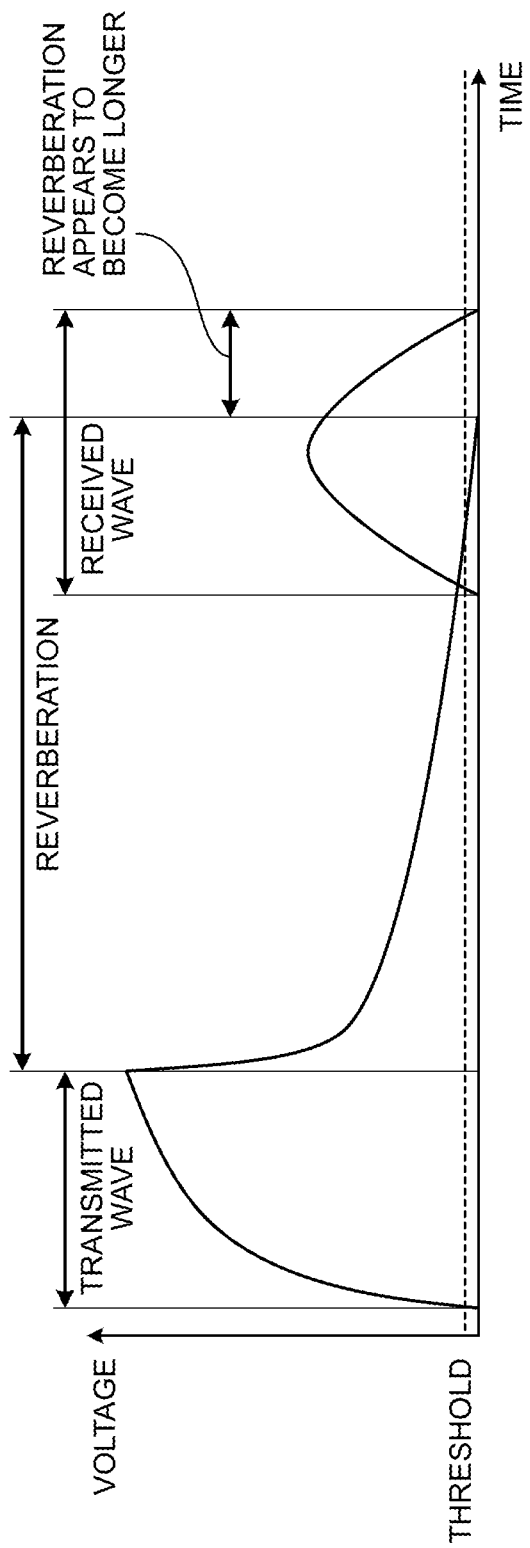
FIG. 4 is a diagram for explaining a change in reverberation according to a transmitted wave according to the embodiment.
Figure 5:
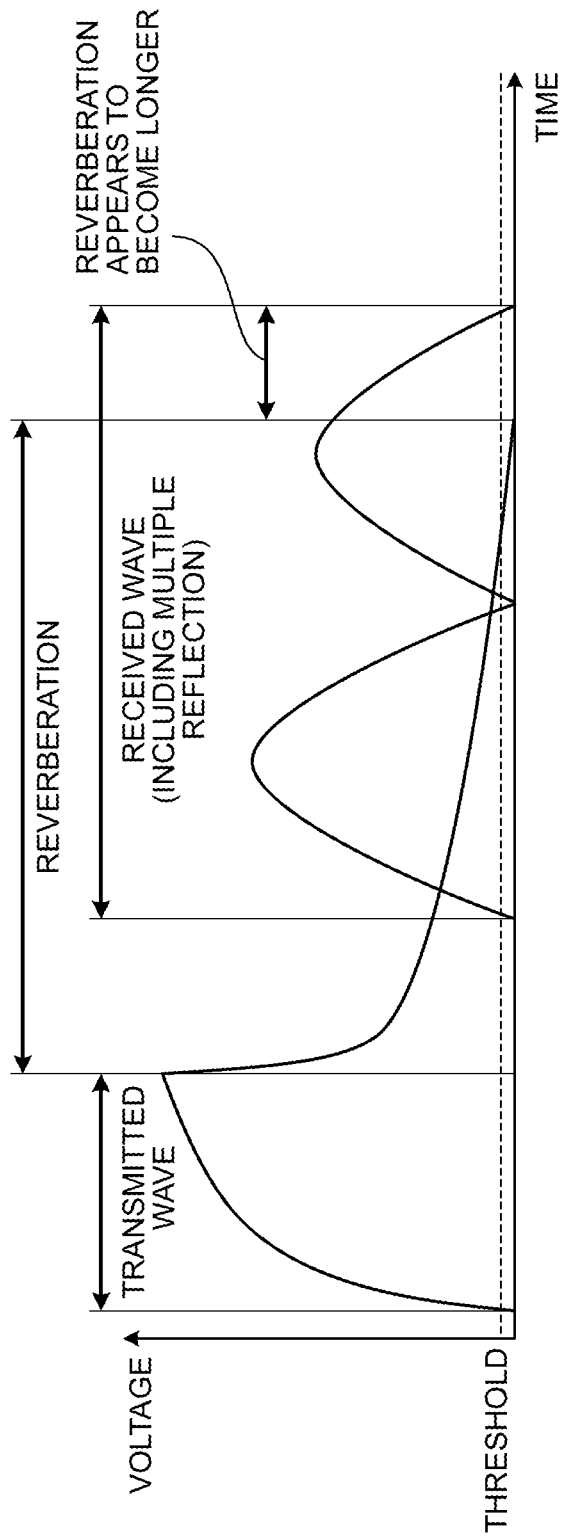
FIG. 5 is a diagram for explaining a change in reverberation according to the transmitted wave according to the embodiment.
Figure 6:
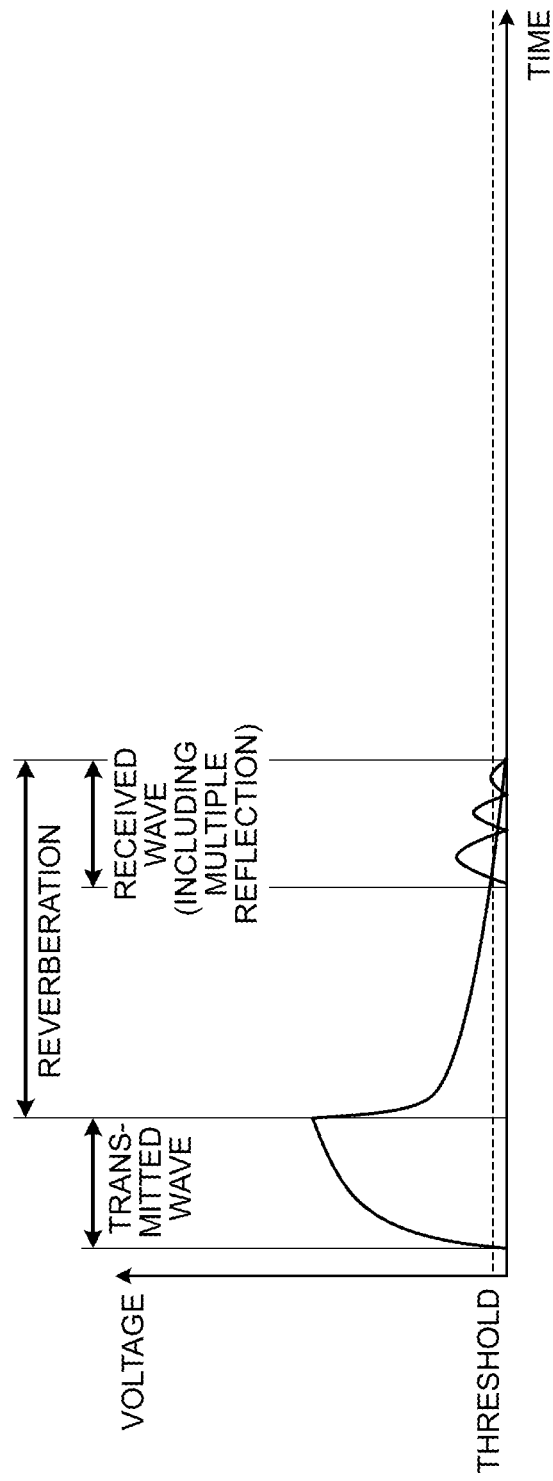
FIG. 6 is a diagram for explaining a change in reverberation according to the transmitted wave according to the embodiment.

Next, a change in reverberation according to the transmitted wave will be described. For example, it is assumed that a transmitted wave has a large sound pressure to be generated. In this case, as illustrated in FIG. 4, when the distance to an object is short and a received wave returns during reverberation, the received wave cannot fall below the threshold within the normal reverberation period. Thus, the reverberation appears to become longer (it is difficult to detect the received wave). In the case where the transmitted wave is large, the received wave is also large. Therefore, as illustrated in FIG. 5, even when the received wave (the initial wave) is completely covered within the reverberation, the reverberation appears to become longer by the waves subjected to multiple reflection between objects. On the other hand, in a case where a transmitted wave has a small sound pressure to be generated and no foreign substance is attached, a received wave is also small and the influence on reverberation is small, as illustrated in FIG. 6. In this case, the time during the original reverberation is also shorter, so that the reverberation and the received wave do not overlap with each other, and normal detection may be performed.

As described above, if a foreign substance is attached to the piezoelectric element 11, the reverberation appears to become longer than usual regardless of whether the transmitted wave has a large sound pressure or a small sound pressure. On the other hand, in a case where an object is present in the neighborhood of the piezoelectric element 11, the reverberation appears to become longer than usual when the transmitted wave has a large sound pressure, whereas the reverberation does not appear to become longer so much when the transmitted wave has a small sound pressure and normal detection may be performed. The determination circuit 17 of the present embodiment can generate, by utilizing the above-described interaction, a near flag on the basis of a change in reverberation associated with a change in the level of the oscillating ultrasound waves. More specifically, the determination circuit 17 determines that an object is present in the neighborhood of the sonar device 10 rather than adhesion of a foreign substance on the basis of how reverberation of two types of transmitted waves becomes longer, and generates (or sets) a near flag.

When a near flag is generated in a manner described above, the determination circuit 17 transmits the generated near flag to the communication circuit 19. The communication circuit 19 transmits the near flag received from the determination circuit 17 to the vehicle control device 30 via the network 40. In the following description, information transmitted from the sonar device 10 to the vehicle control device 30 via the network 40 may be referred to as "sonar information". The sonar information includes a detection time, a near flag, and so on.

Figure 7:
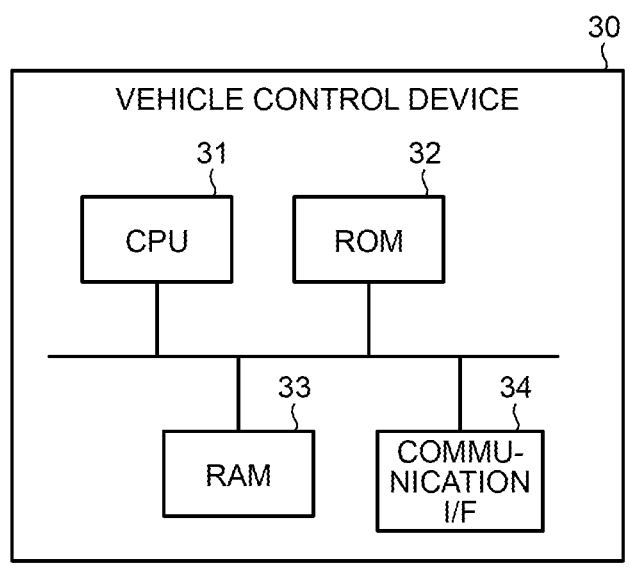
FIG. 7 is a diagram illustrating an example of a hardware configuration of a vehicle control device according to the embodiment.

Next, a specific configuration of the vehicle control device 30 will now be described. As illustrated in FIG. 7, the vehicle control device 30 includes a central processing unit (CPU) 31, a read only memory (ROM) 32, a random-access memory (RAM) 33, and a communication IF 34.

The CPU 31 comprehensively controls the operation of the vehicle control device 30 by executing a program and implements various functions provided in the vehicle control device 30. The ROM 32 is a non-volatile memory and stores various types of data including programs for activating the vehicle control device 30. The RAM 33 is a volatile memory having a work area of the CPU 31. The communication IF 34 is an interface for connecting to the network 40.

Figure 8:
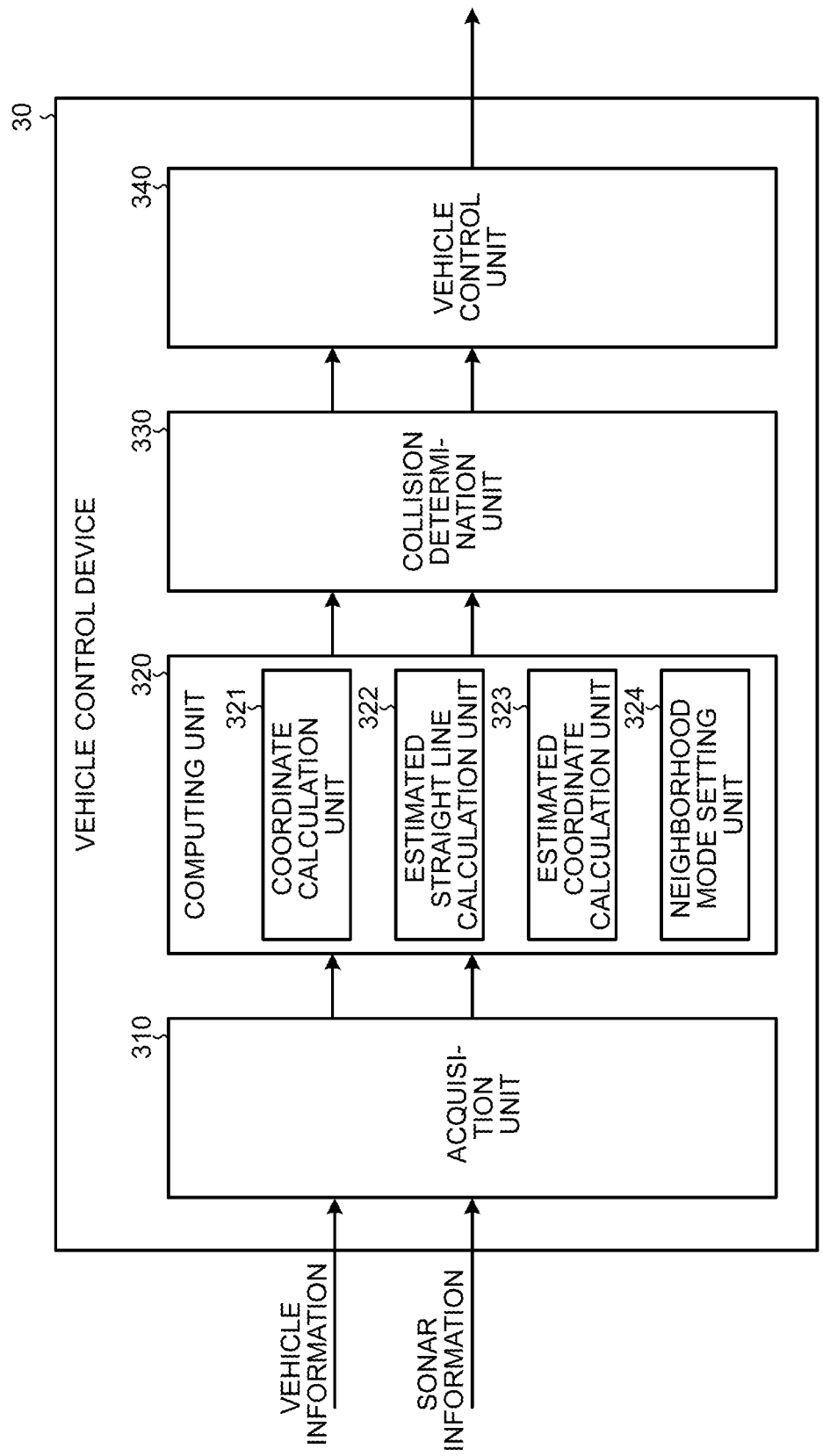
FIG. 8 is a diagram illustrating an example of the functions provided in the vehicle control device according to the embodiment.

As illustrated in FIG. 8, the vehicle control device 30 includes an acquisition unit 310 (an example of acquisition circuitry), a computing unit 320, a collision determination unit 330, and a vehicle control unit 340.

The acquisition unit 310 acquires sonar information transmitted by the sonar device 10 and vehicle information transmitted by the vehicle information detection device 20.

The computing unit 320 executes various computing processes on the basis of the information (sonar information and vehicle information) acquired by the acquisition unit 310. As illustrated in FIG. 8, the computing unit 320 includes a coordinate calculation unit 321, an estimated straight line calculation unit 322 (an example of estimated straight line calculation circuitry), an estimated coordinate calculation unit 323 (an example of estimated coordinate calculation circuitry), and a neighborhood mode setting unit 324 (an example of neighborhood mode setting circuitry).

Figure 9A:
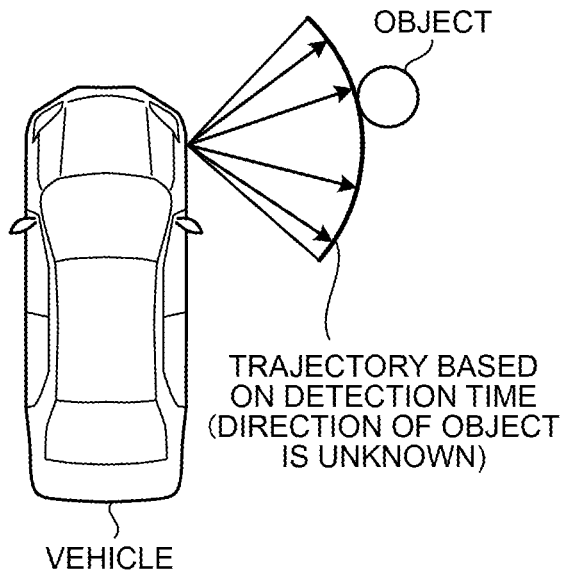
FIG. 9A is a diagram for explaining a method of calculating coordinates by the sonar device according to the embodiment.
Figure 9B:
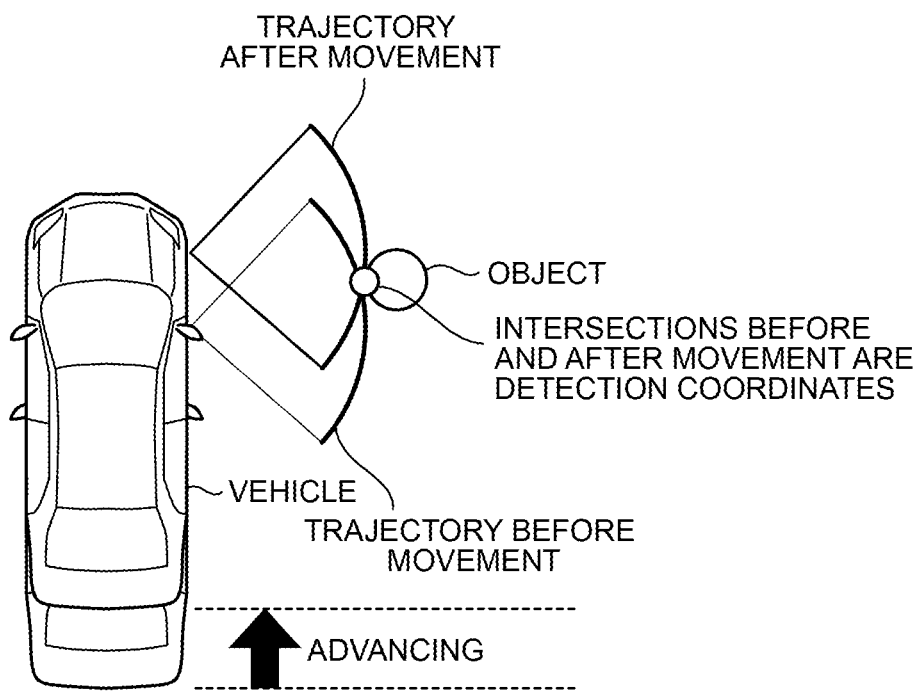
FIG. 9B is a diagram for explaining a method of calculating coordinates by the sonar device according to the embodiment.

The coordinate calculation unit 321 is an example of a "position information calculation unit" (or "position information calculation circuitry"). The coordinate calculation unit 321 calculates coordinates (an example of "position information") indicating the position of an object, on the basis of one or more detection times acquired by the acquisition unit 310. As one example, a case of coordinate generation by a single sonar device 10 will be described. As illustrated in FIG. 9A, the distance to an object (a pole in the example of FIG. 9A) can be measured by the single sonar device 10, but the direction is unknown. Even in such a case, the coordinate calculation unit 321 can generate coordinates indicating the position of the object by using two detection times measured before and after the movement of the vehicle, as illustrated in FIG. 9B. More specifically, the coordinate calculation unit 321 can calculate, as the coordinates indicating the position of the detected object, an intersection point between two arc-shaped trajectories, each connecting a plurality of positions where an object may be present. One of the arc-shaped trajectories is obtained on the basis of the detection time before the movement of the vehicle. The other one of the arc-shaped trajectories is obtained on the basis of the detection time after the movement of the vehicle.

Figure 10:
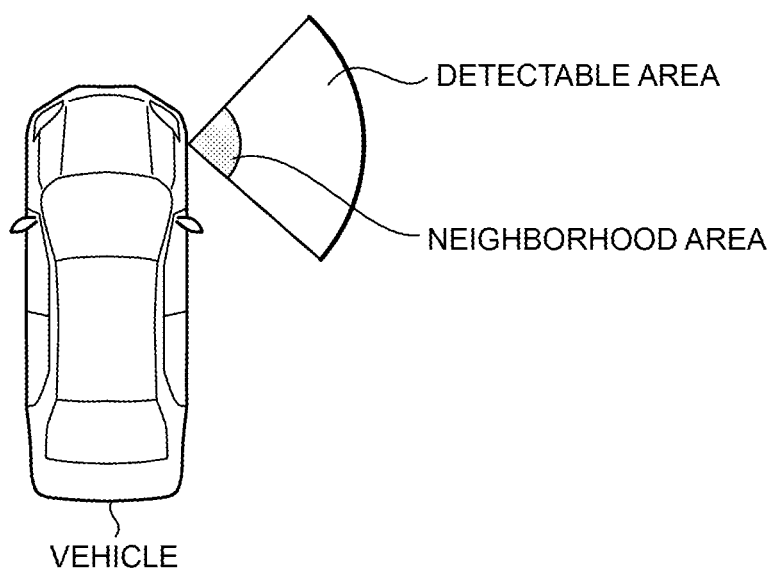
FIG. 10 is a diagram for explaining a detection area by the device according to the embodiment.
Figure 11A:
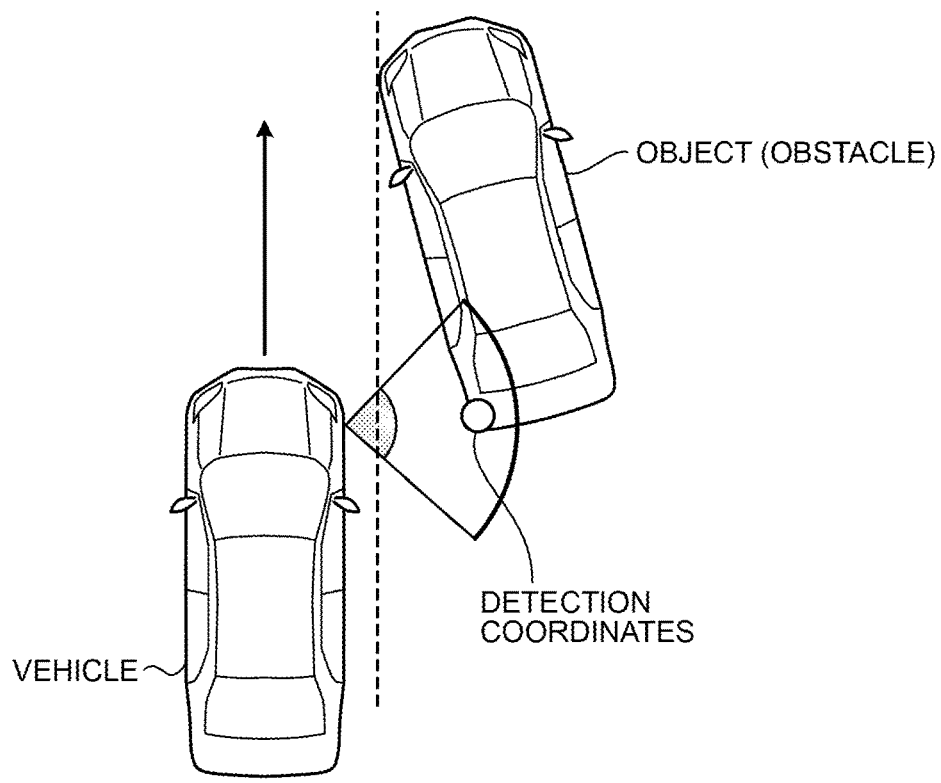
FIG. 11A is a diagram for explaining a method of calculating an estimated straight line according to the embodiment.
Figure 11B:
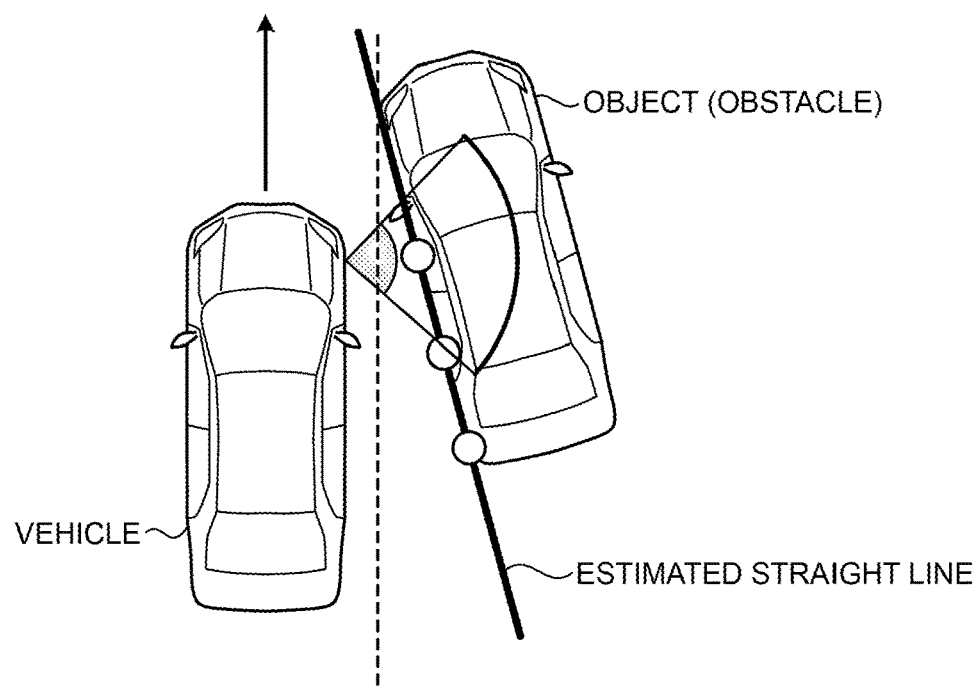
FIG. 11B is a diagram for explaining a method of calculating an estimated straight line according to the embodiment.

Returning to FIG. 8, the description will be continued. The estimated straight line calculation unit 322 calculates an estimated straight line connecting the positions of an object that change over time, on the basis of one or more detection times acquired by the acquisition unit 310. For example, the estimated straight line calculation unit 322 can calculate the estimated straight line on the basis of the positional coordinates calculated by the coordinate calculation unit 321. As illustrated in FIG. 10, the detection area for detecting the side of the vehicle by the sonar device 10 is divided into a detectable area and a neighborhood area. The detectable area is an area in which an object can be detected and the distance to the object can be measured. The neighborhood area is close to the sonar device 10. The neighborhood area is an area in which the distance to the object cannot be measured due to reverberation but a near flag can be generated. As illustrated in FIG. 11A and FIG. 11B, the coordinate calculation unit 321 described above sequentially calculates a set of coordinates indicating the position of the object detected in the detectable area over time, and the estimated straight line calculation unit 322 calculates, from the sets of coordinates, the estimated straight line estimating the inclination of the object. The estimated straight line calculation unit 322 may calculate, as the estimated straight line, a regression line of the sets of coordinates.

Figure 12:
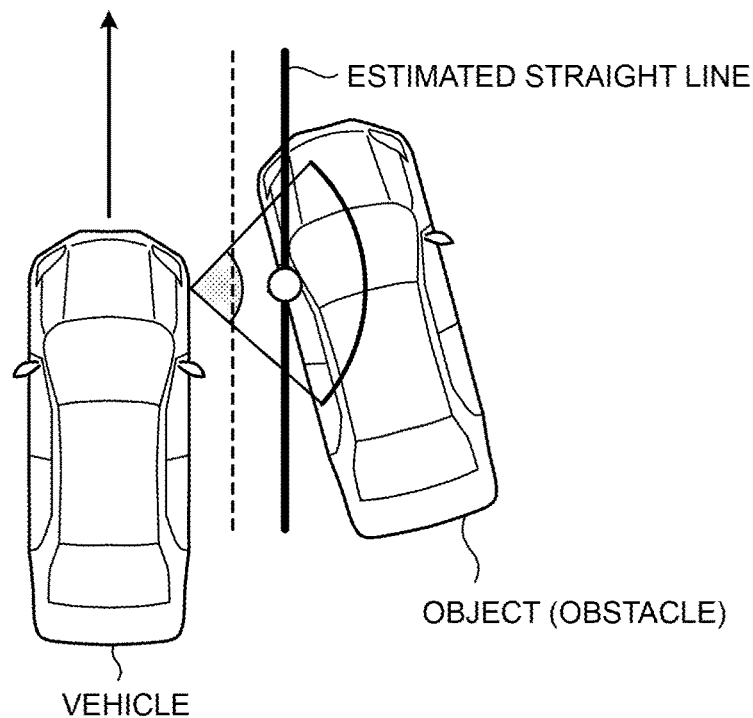
FIG. 12 is a diagram for explaining a method of calculating an estimated straight line in a case of a single set of coordinates in the embodiment.

As illustrated in FIG. 12, in a case where the coordinates calculated by the coordinate calculation unit 321 is a single set of coordinates indicating a single position, the estimated straight line calculation unit 322 can calculate, as the estimated straight line, a straight line that passes through the single set of coordinates and is parallel to the vehicle.

Figure 13:
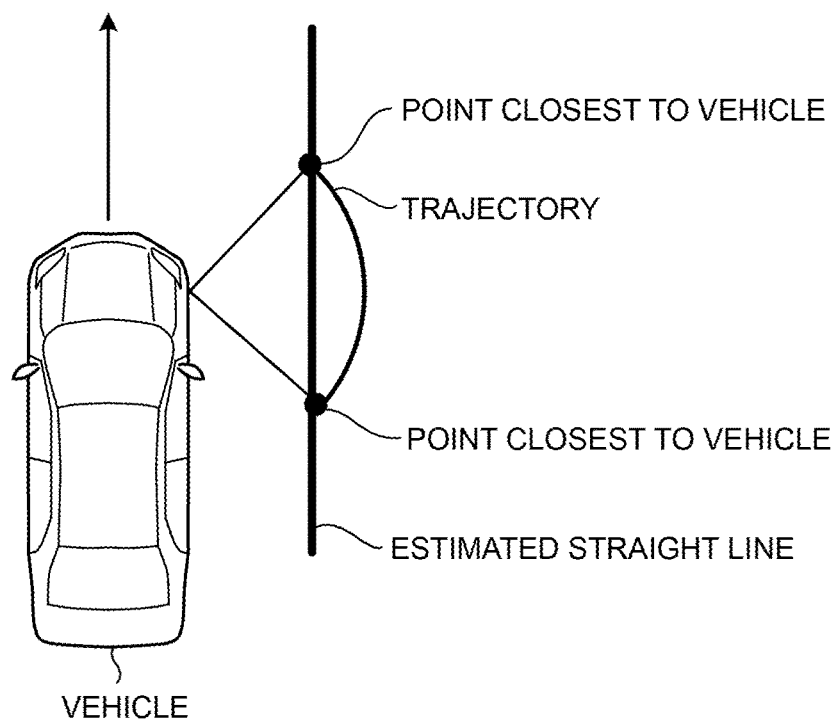
FIG. 13 is a diagram for explaining a method of calculating an estimated straight line in a case where the coordinates are not calculated and one detection time has been acquired in the embodiment.

In a case where the coordinates are not calculated by the coordinate calculation unit 321 and one detection time has been acquired by the acquisition unit 310, the estimated straight line calculation unit 322 can calculate, as the estimated straight line, a straight line that passes through positions closest to the vehicle (worst points) and is parallel to the vehicle (see FIG. 13). The positions closest to the vehicle (worst points) are included in a trajectory that is obtained on the basis of the one detection time and connects a plurality of positions where an object may be present.

Figure 14:
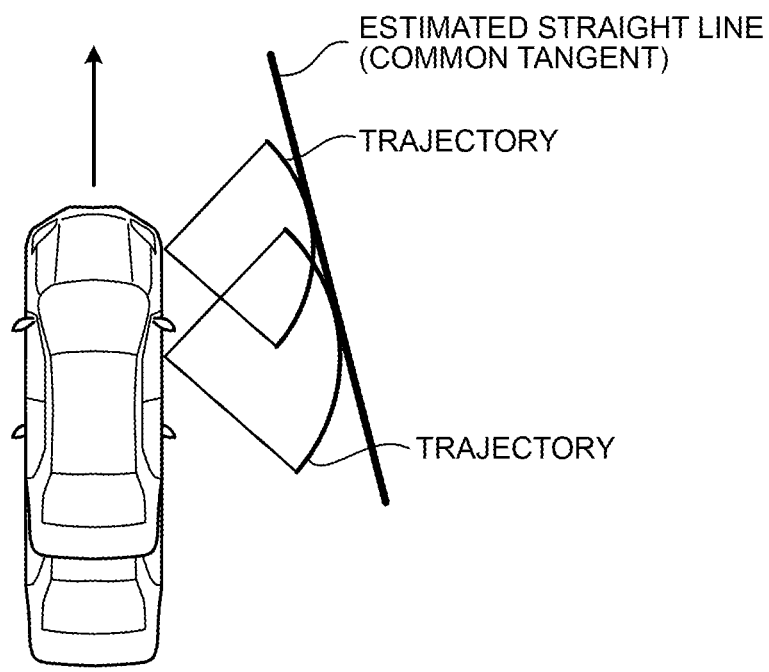
FIG. 14 is a diagram for explaining a method of calculating an estimated straight line in a case where the coordinates are not calculated and two detection times have been acquired in the embodiment.

For another example, in a case where the coordinates are not calculated by the coordinate calculation unit 321 and two detection times have been acquired by the acquisition unit 310, the estimated straight line calculation unit 322 can calculate, as the estimated straight line, a straight line that touches two trajectories each connecting a plurality of positions where an object may be present (see FIG. 14). The two trajectories correspond one-to-one to the two detection times. The two trajectories are each obtained on the basis of a corresponding one of the two detection times.

Figure 15:
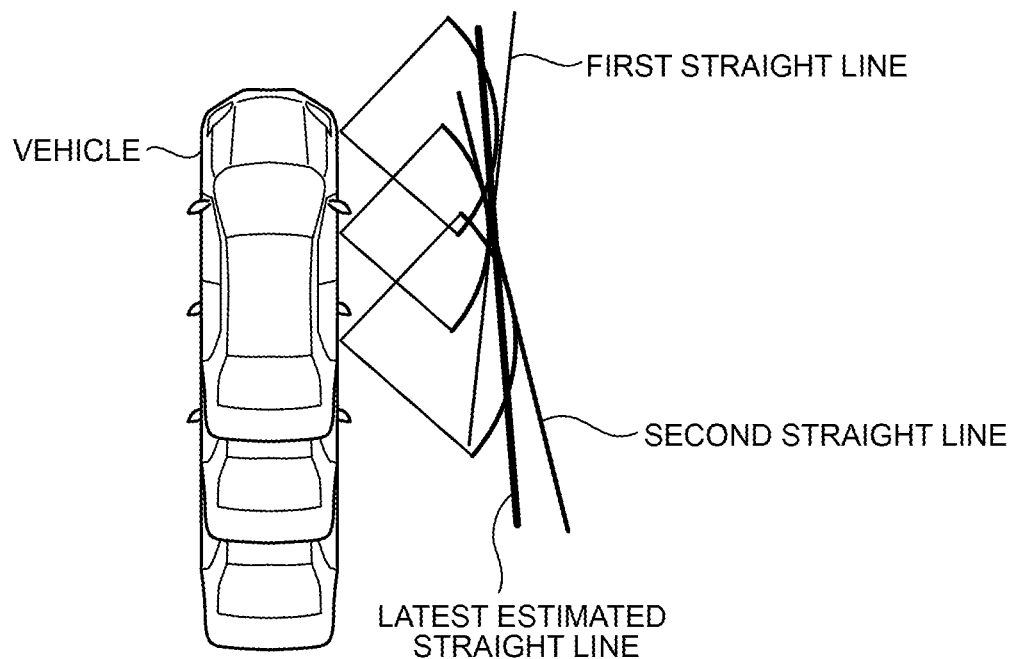
FIG. 15 is a diagram for explaining a method of calculating an estimated straight line in a case where the coordinates is not calculated and three detection times have been acquired in the embodiment.

For still another example, in a case where the coordinates are not calculated by the coordinate calculation unit 321 and three detection times have been acquired by the acquisition unit 310, the estimated straight line calculation unit 322 can calculate the latest estimated straight line on the basis of a first straight line and a second straight line (see FIG. 15). The first straight line touches two trajectories each connecting a plurality of positions where an object may be present. One of the two trajectories is obtained on the basis of the latest detection time. The other one of the two trajectories is obtained on the basis of a detection time before the latest detection time. The second straight line indicates an estimated straight line calculated before the latest detection time is acquired. As the latest estimated straight line, the estimated straight line calculation unit 322 can calculate, for example, a straight line that has an average inclination between the first straight line and the second straight line and passes through an intersection point of the first straight line and the second straight line.

Returning to FIG. 8, the description will be continued. In a case where an object is present in the neighborhood of the sonar device 10 but the distance to the object is not measured, the estimated coordinate calculation unit 323 calculates estimated coordinates indicating an estimated position of the object on the basis of the detection time that has been acquired by the acquisition unit 310. In the present embodiment, when the near flag described above is acquired by the acquisition unit 310 (which corresponding to a case where an object is present in the neighborhood of the sonar device 10 but the distance to the object is not measured), the estimated coordinate calculation unit 323 calculates the estimated coordinates on the basis of the detection time that has been acquired by the acquisition unit 310.

Figure 16:
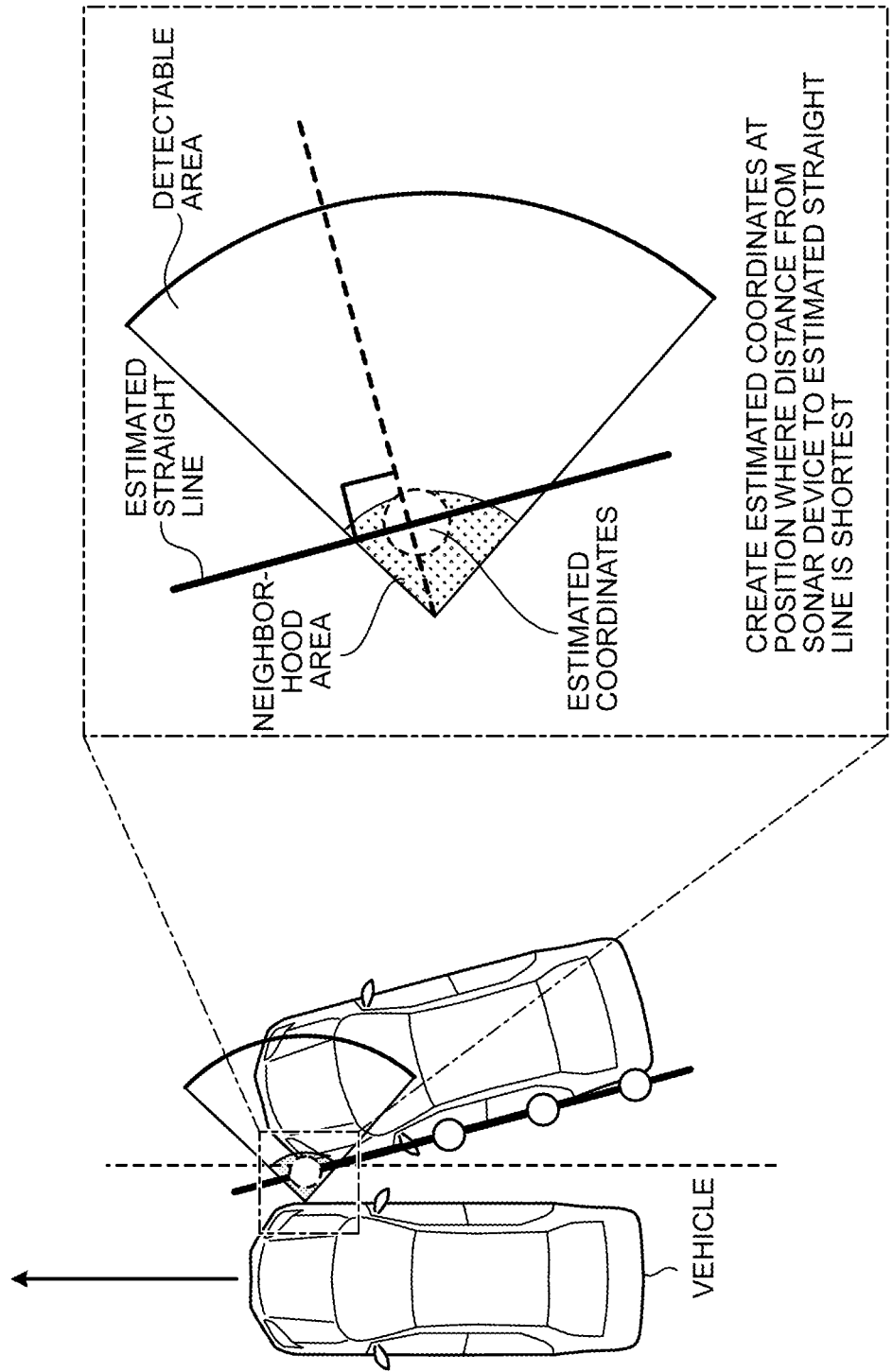
FIG. 16 is a diagram for explaining a method of calculating estimated coordinates according to the embodiment.

More specifically, the estimated coordinate calculation unit 323 calculates the estimated coordinates on the basis of the estimated straight line calculated by the estimated straight line calculation unit 322. In the present embodiment, as illustrated in FIG. 16, the estimated coordinate calculation unit 323 can calculate, as the estimated coordinates, coordinates of a position at which a distance from the sonar device 10 to the estimated straight line is shortest in a predetermined region (the neighborhood area described above) in the neighborhood of the sonar device 10.

Figure 17:
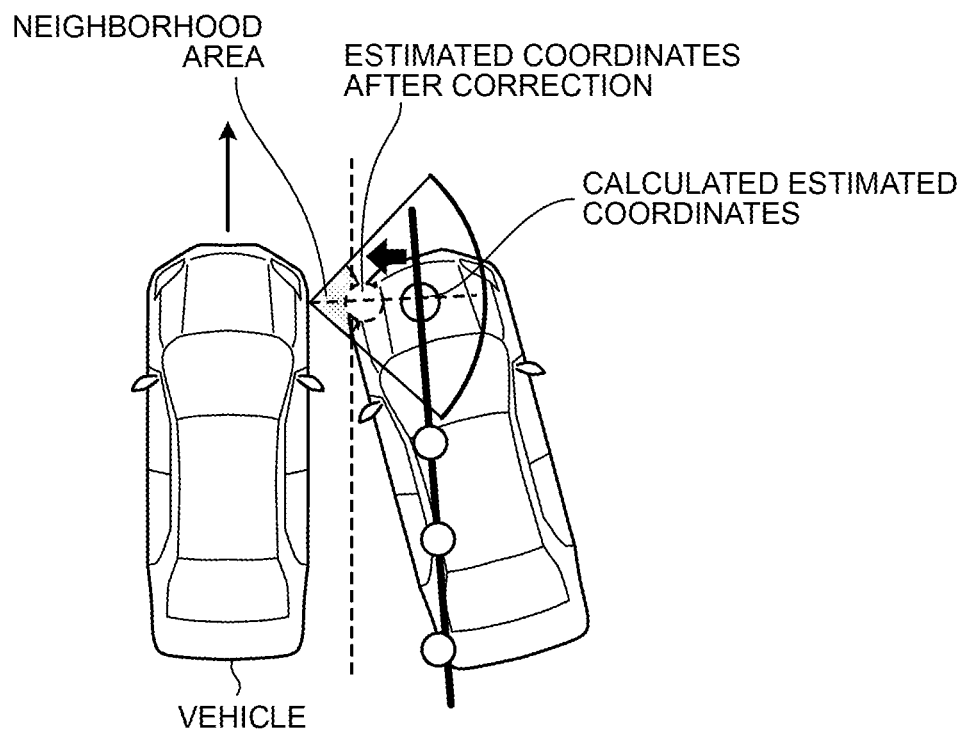
FIG. 17 is a diagram for explaining a method of correcting an estimated straight line according to the embodiment.
Figure 18:
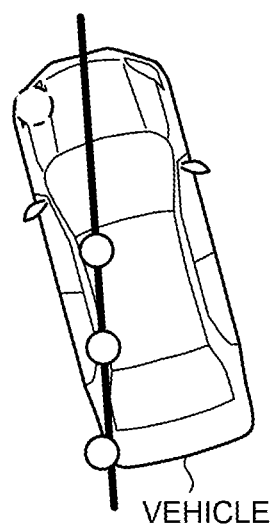
FIG. 18 is a diagram for explaining an example of a variation of a method of calculating the estimated straight line.
Figure 19:
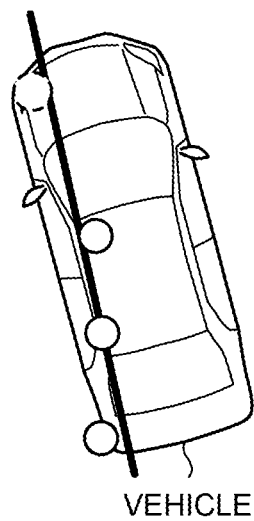
FIG. 19 is a diagram for explaining an example of a variation of a method of calculating the estimated straight line.

Moreover, as illustrated in FIG. 17, in a case where the calculated estimated coordinates are located on the outer side of the vehicle with respect to the neighborhood area, the estimated coordinate calculation unit 323 can correct the estimated coordinates with coordinates of a position closest to the estimated straight line in the neighborhood area. When the estimated coordinates are corrected in this manner, the estimated coordinate calculation unit 323 can also calculate the estimated straight line by using fixed sets of coordinates without using the corrected estimated coordinates, as illustrated in FIG. 18. Alternatively, as illustrated in FIG. 19, the estimated coordinate calculation unit 323 can calculate the estimated straight line by using both the corrected estimated coordinates and the fixed sets of coordinates.

Figure 20:
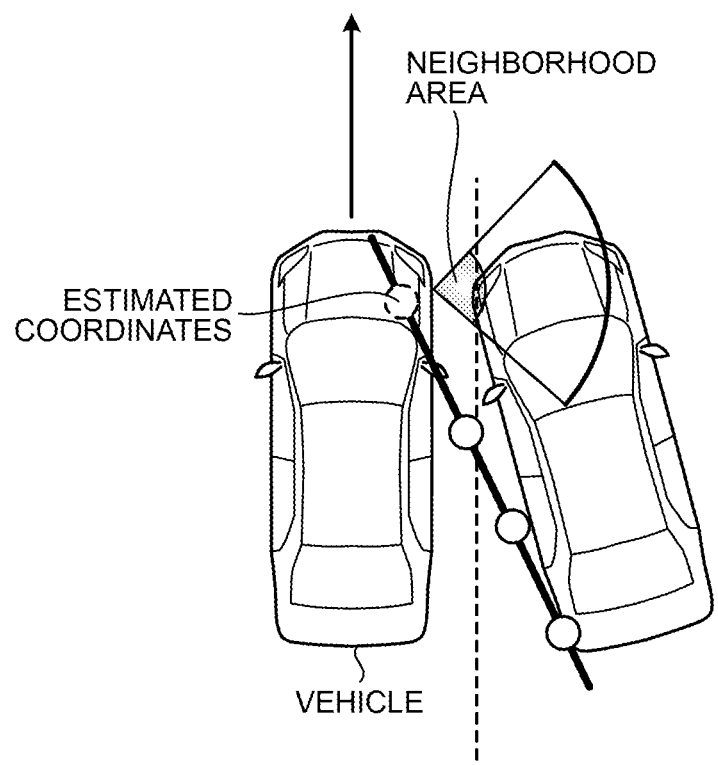
FIG. 20 is a diagram for explaining control of a vehicle in a case where the estimated coordinates are located on the inner side of the vehicle with respect to a neighborhood area.

Returning to FIG. 8, the description will be continued. The neighborhood mode setting unit 324 can set the control mode related to braking of the vehicle to a neighborhood mode in which control for braking the vehicle is performed when an operation of turning the vehicle in the direction that an object is present (typically, an operation of turning the steering wheel in the direction that an object is present) is performed. For example, as illustrated in FIG. 20, in a case where the estimated coordinates calculated by the estimated coordinate calculation unit 323 are located on the inner side of the vehicle with respect to the neighborhood area, the neighborhood mode setting unit 324 can set the control mode related to braking of the vehicle to the neighborhood mode.

In the present embodiment, the neighborhood mode setting unit 324 can turn off the neighborhood mode when the detection time is acquired by the acquisition unit 310. The neighborhood mode setting unit 324 can turn off the neighborhood mode in a state where the detection time is not acquired by the acquisition unit 310 and the near flag is not acquired (for example, a state where neither the detection time nor the near flag is included in the sonar information). Moreover, the neighborhood mode setting unit 324 can turn on the neighborhood mode in a state in which the near flag is acquired by the acquisition unit 310 and the estimated straight line is not calculated.

The description of FIG. 8 will be continued. The collision determination unit 330 performs collision determination on the basis of the coordinates (including the estimated coordinates) calculated by the computing unit 320. When the collision determination unit 330 determines that a vehicle will collide (which means that the vehicle approaches the coordinates present in the traveling direction of the vehicle), the vehicle control unit 340 performs control to operate the brake of the vehicle. The specific configuration of the vehicle control device 30 of the present embodiment has been described above.

Figure 21:
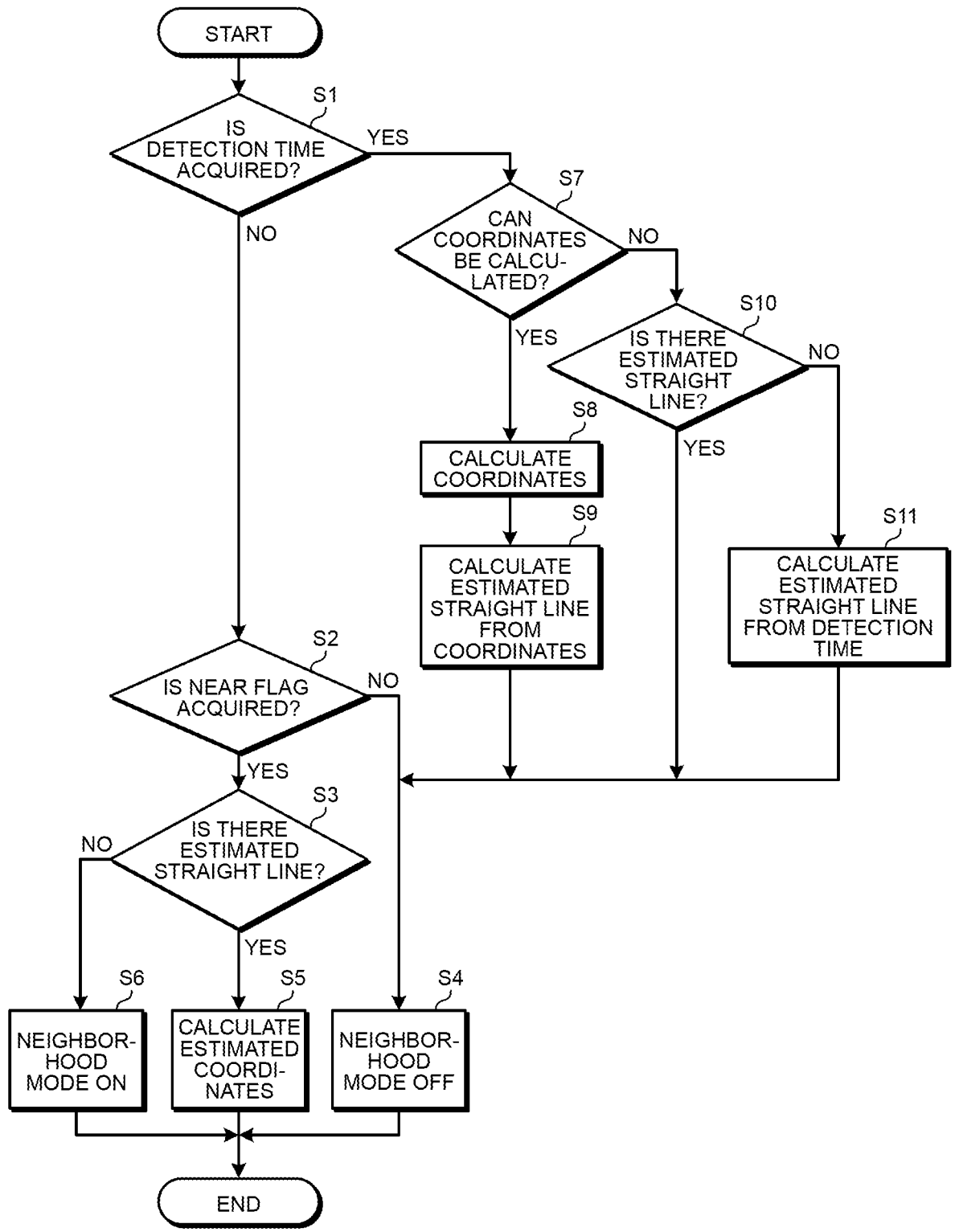
FIG. 21 is a flowchart illustrating an operation example of the vehicle control device according to the embodiment.

FIG. 21 is a flowchart illustrating an operation example of the vehicle control device according to the present embodiment. As illustrated in FIG. 21, in a case where a detection time is not included in the sonar information acquired by the acquisition unit 310, for example, when a detection time has not been acquired (Step S1: No), the process proceeds to Step S2. In Step S2, in a case where a near flag is included in the sonar information acquired by the acquisition unit 310, for example, when a near flag has been acquired (Step S2: Yes), the process proceeds to Step S3. On the other hand, in Step S2, when a near flag has not been acquired (Step S2: No), the neighborhood mode setting unit 324 turns off the neighborhood mode (Step S4).

In Step S3, in a case where an estimated straight line has been calculated (Step S3: Yes), the estimated coordinate calculation unit 323 calculates estimated coordinates (Step S5). The method of calculating the estimated coordinates is as described above. On the other hand, in Step S3, in a case where an estimated straight line has not been calculated (Step S3: No), the neighborhood mode setting unit 324 turns on the neighborhood mode (Step S6).

In Step S1 described above, if the detection time has been acquired (Step S1: Yes), the process proceeds to Step S7. In Step S7, in a case where calculation of coordinates can be performed by the coordinate calculation unit 321 (Step S7: Yes), the coordinate calculation unit 321 calculates coordinates (Step S8). The method of calculating the coordinates is as described above. Subsequently, the estimated straight line calculation unit 322 calculates the estimated straight line from the coordinates calculated by the coordinate calculation unit 321 (Step S9). The method of calculating the estimated straight line is as described above.

On the other hand, if the calculation of coordinates cannot be performed by the coordinate calculation unit 321 (Step S7: No) and there is an estimated straight line calculated by the estimated straight line calculation unit 322 (Step S10: Yes), the process proceeds to Step S4. In Step S4, the neighborhood mode setting unit 324 turns off the neighborhood mode. If the coordinate calculation cannot be performed by the coordinate calculation unit 321 (Step S7: No) and there is no estimated straight line calculated by the estimated straight line calculation unit 322 (Step S10: No), the estimated coordinate calculation unit 323 calculates the estimated straight line from the acquired detection time (Step S11). The method of calculating the estimated straight line is as described above.

Figure 22:
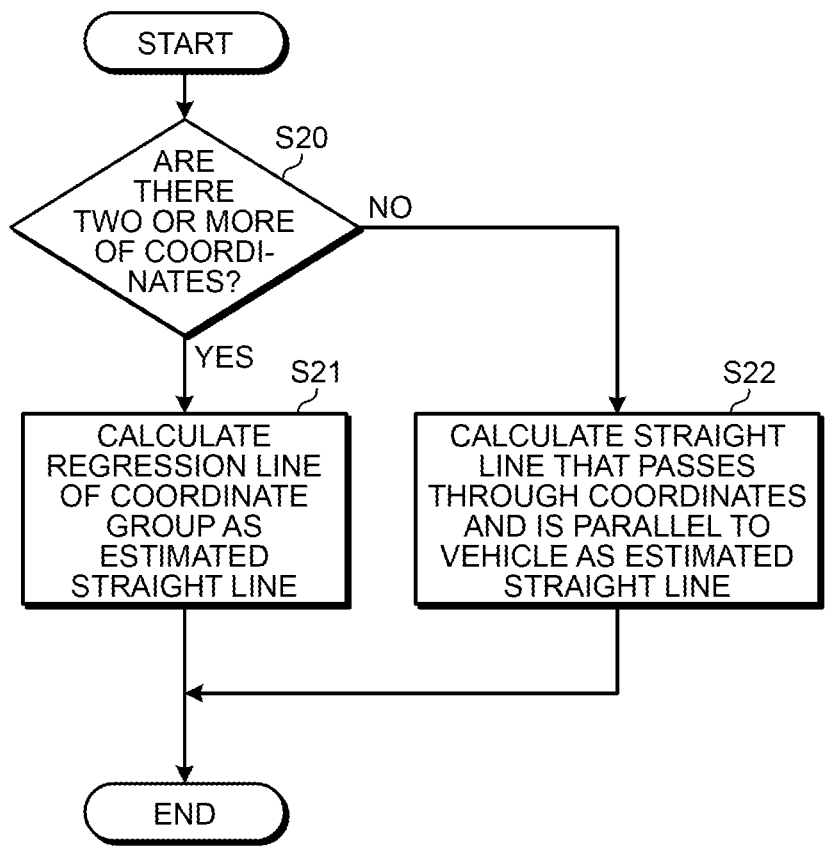
FIG. 22 is a diagram illustrating a detailed example of a process of calculating the estimated straight line according to the embodiment.

FIG. 22 is a diagram illustrating a detailed example of the process of calculating the estimated straight line in Step S9 of FIG. 21. As illustrated in FIG. 22, in a case where two or more sets of coordinates have been calculated by the coordinate calculation unit 321 (Step S20: Yes), the estimated straight line calculation unit 322 calculates a regression line of those sets of coordinates as the estimated straight line (Step S21). On the other hand, in a case where one set of coordinates has been calculated by the coordinate calculation unit 321 (Step S20: No), the estimated straight line calculation unit 322 calculates, as the estimated straight line, a straight line that passes through the one set of coordinates and is parallel to the vehicle (Step S22).

Figure 23:
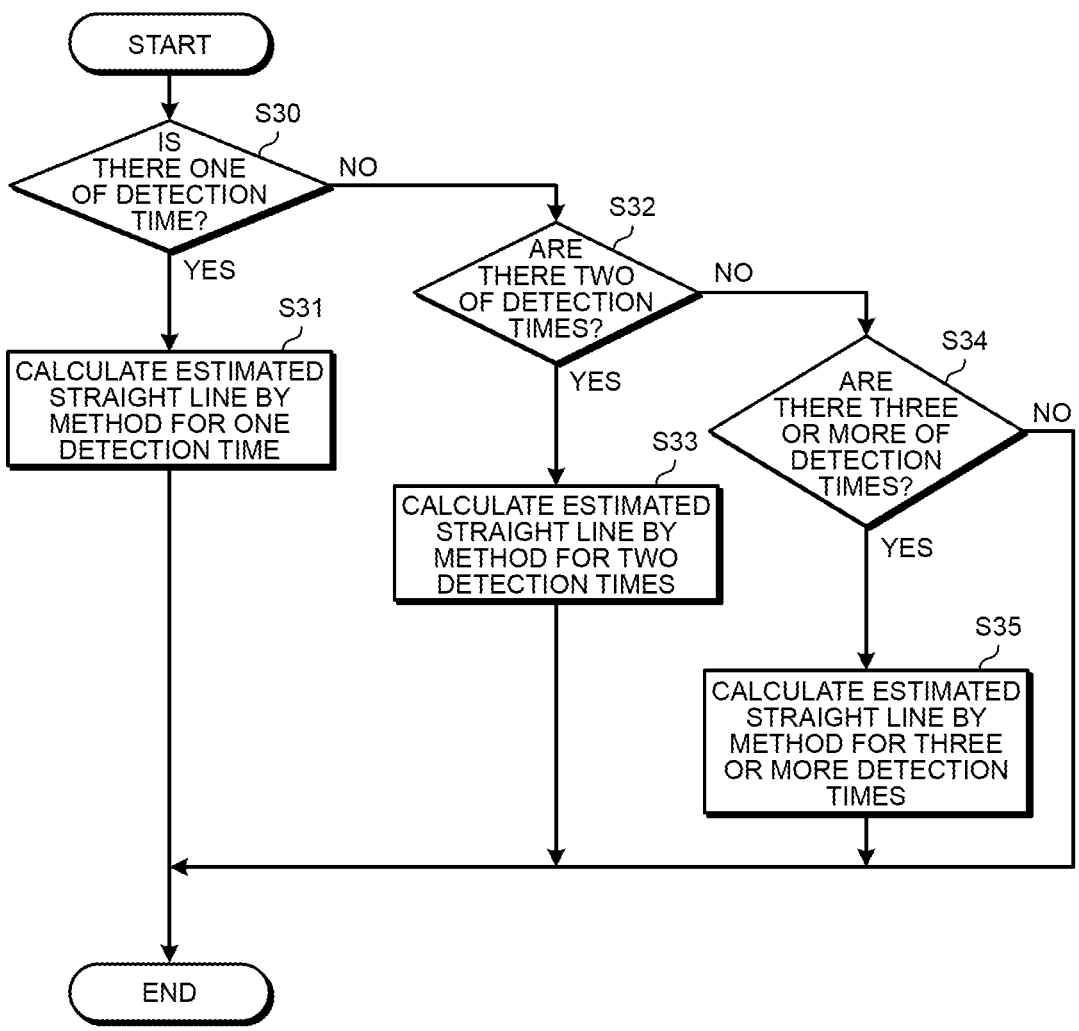
FIG. 23 is a diagram illustrating a detailed example of a process of calculating the estimated straight line according to the embodiment.

FIG. 23 is a diagram illustrating a detailed example of the process of calculating the estimated straight line in Step 11 of FIG. 21. As illustrated in FIG. 23, in a case where one detection time has been acquired by the acquisition unit 310 (Step S30: Yes), the estimated straight line calculation unit 322 calculates an estimated straight line by a method for the case of one detection time (Step S31). In this case, as described above, the estimated straight line calculation unit 322 calculates, as the estimated straight line, a straight line that passes through positions closest to the vehicle and is parallel to the vehicle. The positions closest to the vehicle are included in a trajectory that is obtained on the basis of the one detection time and connects a plurality of positions where an object may be present.

In a case where two detection times have been acquired by the acquisition unit 310 (Step S30: No, Step S32: Yes), the estimated straight line calculation unit 322 calculates an estimated straight line by a method for the case of two detection times (Step S33). In this case, as described above, the estimated straight line calculation unit 322 calculates, as the estimated straight line, a straight line that touches two trajectories each connecting a plurality of positions where an object may be present. The two trajectories correspond one-to-one to the two detection times. The two trajectories are each obtained on the basis of a corresponding one of the two detection times.

In a case where three or more detection times have been acquired by the acquisition unit 310 (Step S30: No, Step S32: No, Step S34: Yes), the estimated straight line calculation unit 322 calculates an estimated straight line by a method for the case of three or more detection times (Step S35). In this case, as described above, the estimated straight line calculation unit 322 calculates the latest estimated straight line on the basis of a first straight line and a second straight line. The first straight line touches two trajectories each connecting a plurality of positions where an object may be present. One of the two trajectories is obtained on the basis of the latest detection time. The other one of the two trajectories is obtained on the basis of a detection time before the latest detection time. The second straight line indicates an estimated straight line calculated before the latest detection time is acquired.

Figure 24:
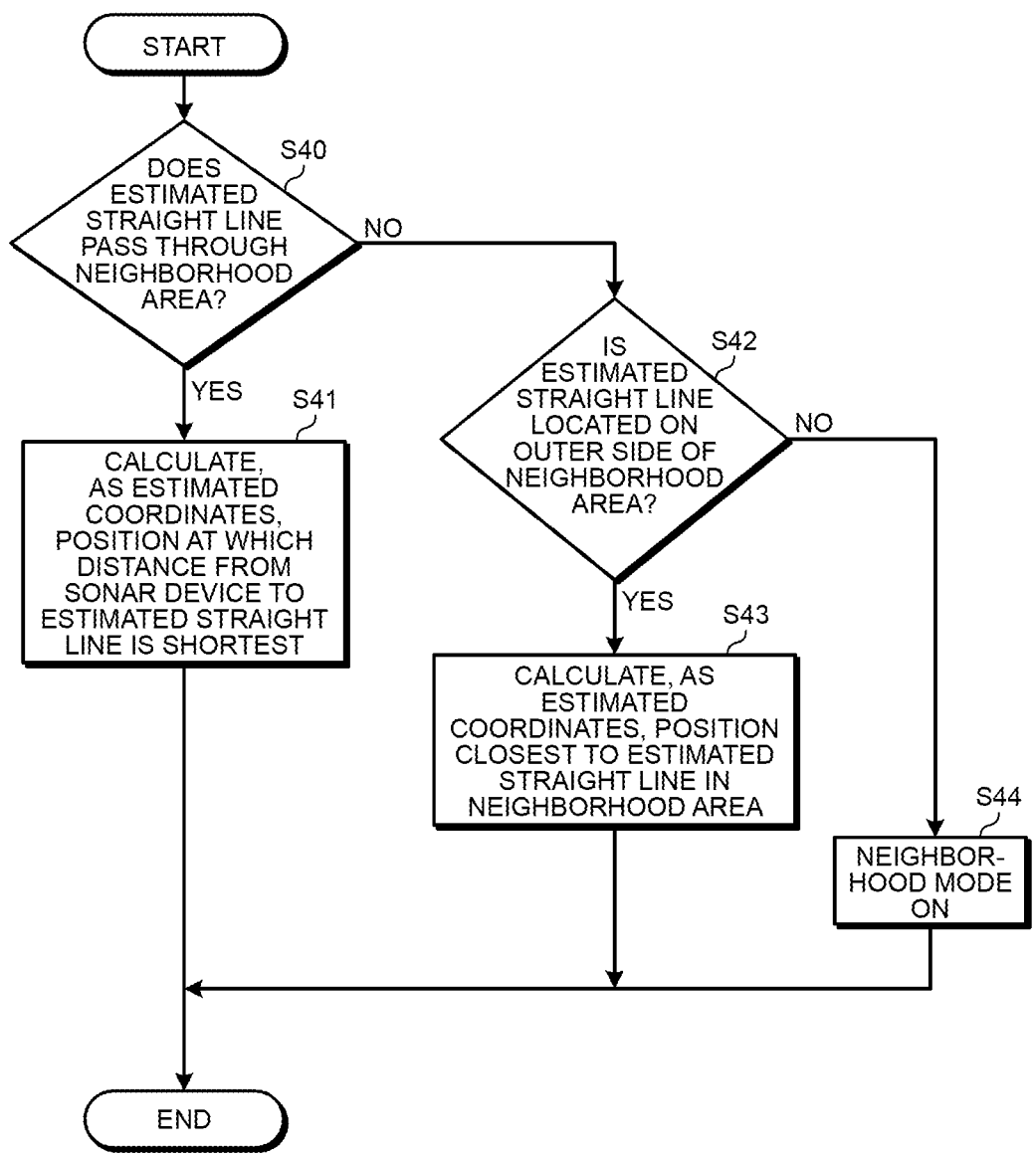
FIG. 24 is a diagram illustrating a detailed example of a process of calculating the estimated coordinates according to the embodiment.

FIG. 24 is a diagram illustrating a detailed example of the process of calculating the estimated coordinates in Step S5 of FIG. 21. As illustrated in FIG. 24, in a case where the estimated straight line calculated by the estimated straight line calculation unit 322 passes through a neighborhood area (Step S40: Yes), the estimated coordinate calculation unit 323 calculates, as the estimated coordinates, coordinates of a position at which a distance from the sonar device 10 to the estimated straight line is shortest as described above (Step S41). On the other hand, if the estimated straight line does not pass through the neighborhood area but is located on the outer side of the vehicle with respect to the neighborhood area (Step S40: No, Step S42: Yes), the estimated coordinate calculation unit 323 calculates, as the estimated coordinates, coordinates of a position closest to the estimated straight line in the neighborhood area as described above (Step S43). On the other hand, in a case where the estimated straight line is located on the inner side of the vehicle with respect to the neighborhood area (Step S42: No), the neighborhood mode setting unit 324 turns on the neighborhood mode (Step S44) as described above.

Figure 25:
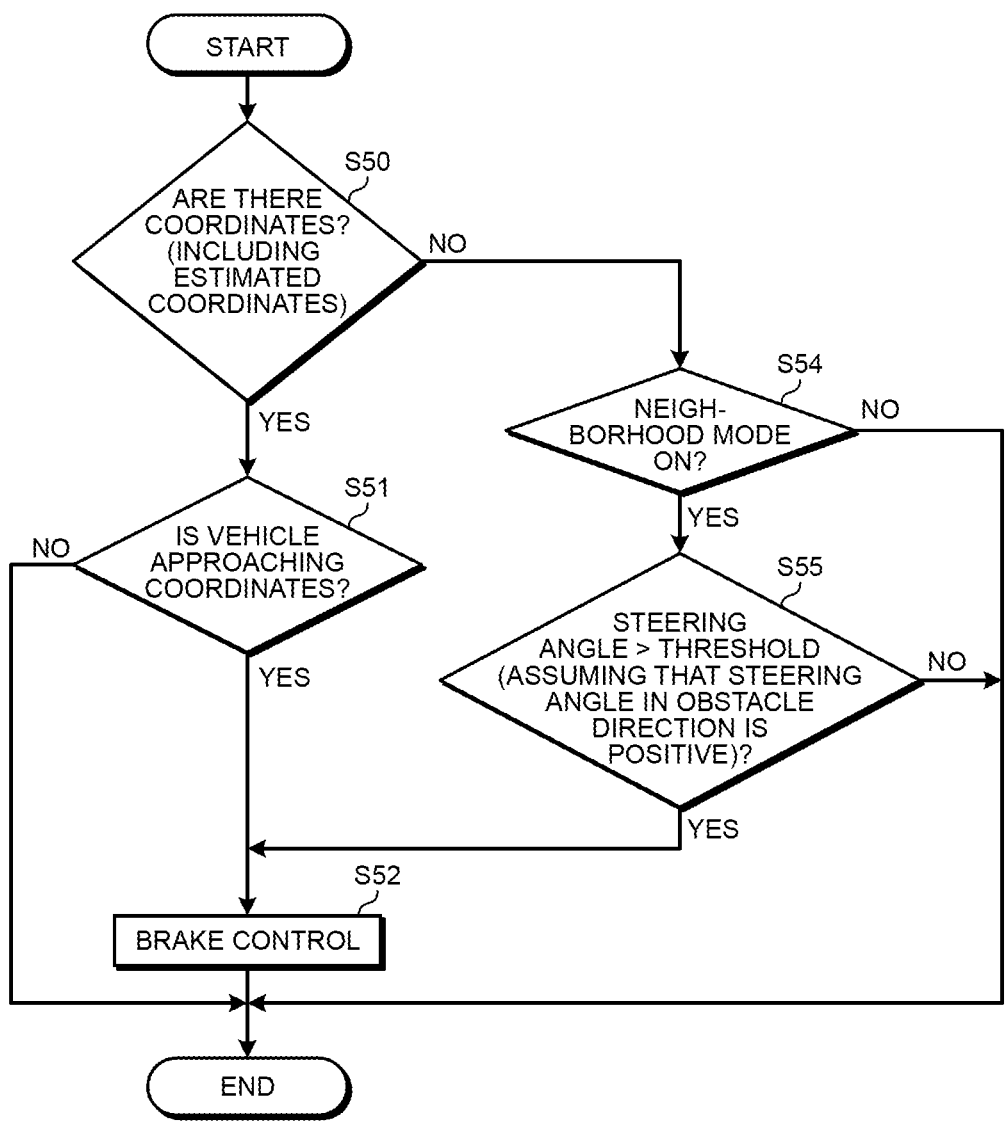
FIG. 25 is a flowchart illustrating an operation example related to vehicle control of the vehicle control device according to the embodiment.

FIG. 25 is a flowchart illustrating an operation example related to vehicle control of the vehicle control device 30. As illustrated in FIG. 25, in a case where coordinates (including the estimated coordinates) calculated by the computing unit 320 are present (Step S50: Yes), the collision determination unit 330 determines whether or not the vehicle is approaching the coordinates (Step S51). In this example, when the vehicle approaches the coordinates present in the traveling direction of the vehicle, the determination result in Step S51 indicates positive (Yes), and the vehicle control unit 340 performs control to operate the brake of the vehicle (Step S52).

On the other hand, when the coordinates calculated by the computing unit 320 are not present and the neighborhood mode has been turned on (Step S50: No, Step S54: Yes), the vehicle control unit 340 controls braking of the vehicle in the neighborhood mode. In this example, when the steering angle (on the assumption that the steering angle in the object direction is positive) exceeds the threshold (Step S55: Yes), the vehicle control unit 340 performs control to operate the brake of the vehicle.

As described above, in a case where an object is present in the neighborhood of the sonar device 10 but the distance to the object has not been measured (for example, the near flag described above has been generated), the vehicle control device 30 of the present embodiment calculates estimated coordinates indicating the estimated position of the object on the basis of the detection time (one or more detection times) that has been acquired from the sonar device 10. Collision determination can be performed by using the estimated coordinates, so that collision determination accuracy in the neighborhood area can be improved.

Figure 26:
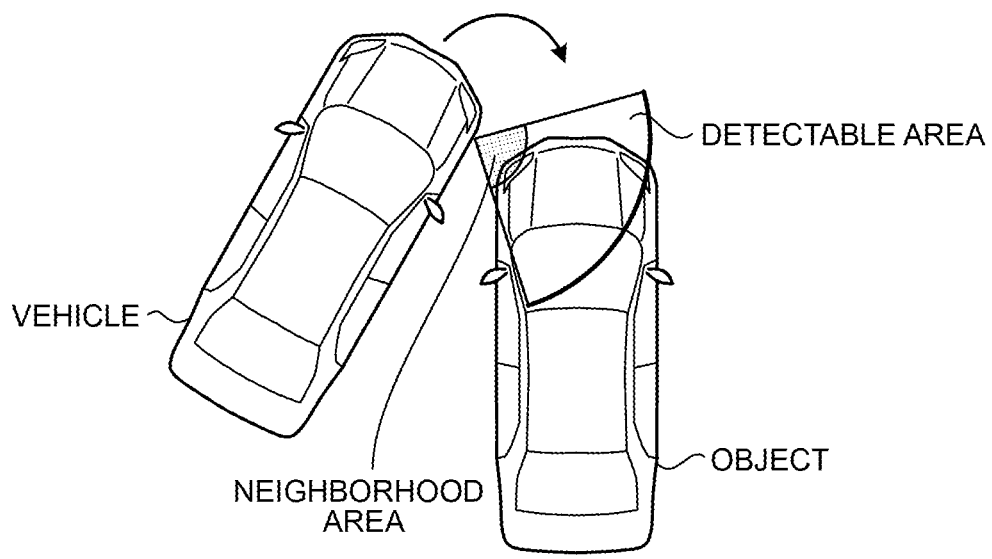
FIG. 26 is a diagram for explaining a comparative example.

Here, it is assumed, as a comparative example, that there is a configuration that does not have the estimated coordinate calculation function described above. In the comparative example, if a scene illustrated in FIG. 26 occurs, the coordinates have not been generated in the neighborhood area in spite of the fact that the brake operation is necessary. Thus, in such a case, it is difficult to perform the collision determination and there is a possibility that the vehicle collides with an object.

Figure 27:
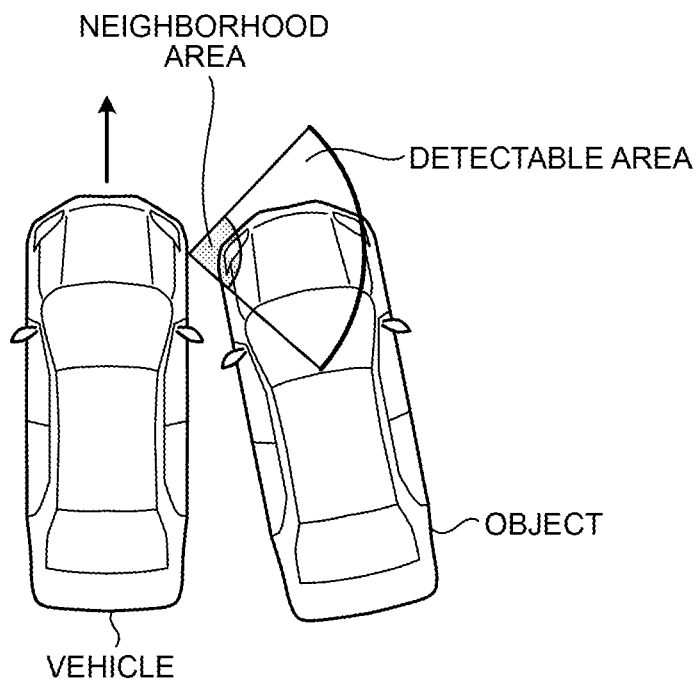
FIG. 27 is a diagram for explaining a comparative example.

In order to avoid the collision described above and illustrated in FIG. 26, if the brake is controlled to be activated at a timing when the near flag is generated, there is a possibility that the brake is activated even when the vehicle is able to go straight without colliding with an object as illustrated in FIG. 27.

In contrast, according to the present embodiment, the collision determination is performed by using the estimated coordinates generated in the neighborhood area. Therefore, the collision determination accuracy can be improved compared to the comparative example described above. Thus, it is possible to operate the brake at an appropriate timing that does not interfere with the travel of the vehicle while avoiding a collision with an object.

While the embodiments of the present disclosure have been described, these embodiments have been presented by way of example only, and are not intended to limit the scope of the inventions. Indeed, the novel methods and systems described herein may be embodied in a variety of other forms; moreover, various omissions, substitutions and changes in the form of the methods and systems described herein may be made without departing from the spirit of the inventions. The accompanying claims and their equivalents are intended to cover such forms or modifications as would fall within the scope and spirit of the inventions.

The advantages described in the embodiments are merely examples and not limited, and may have other advantages.

The notation " . . . er", " . . . or", and " . . . unit" in the above-described embodiments may be replaced with other notations such as " . . . circuitry", " . . . assembly", " . . . device", or " . . . module".

In the above embodiments, an example that is assumed that the present disclosure is configured by using hardware has been described, but the present disclosure can also be implemented by software in cooperation with hardware.

Each of functional blocks used for the description of the above embodiments is typically implemented as a large-scale integrated circuit (LSI) which is an integrated circuit. The integrated circuit controls each of functional blocks used for the description of the above embodiments, and may include an input terminal and an output terminal. These integrated circuits may be individually formed into one chip, or may be formed into one chip so as to include a part or all of the integrated circuits. The integrated circuit is herein referred to as an LSI, but may be referred to as an IC, a system LSI, a super LSI, or an ultra-LSI, depending on a difference of a degree of integration.

The method of circuit integration is not limited to an LSI, and may be implemented by using a dedicated circuit or a general-purpose processor and memory. Circuit integration may use a field programmable gate array (FPGA) that is programmable after manufacture of an LSI or a reconfigurable processor in which connections or settings of circuit cells within the LSI are reconfigurable.

Moreover, if an integrated circuit technology that replaces the LSI appears due to the progress of the semiconductor technology or another derived technology, the functional blocks may be obviously integrated by using the technology. For example, application of biotechnology is also a possibility.

According to the present disclosure, accuracy of collision determination can be improved, for example.

What is claimed is:

1. A vehicle control device, which, in operation, controls a vehicle on a basis of one or more detection times each representing a distance measured by a distance measuring device mounted on the vehicle, the distance measuring device having a detection area in which distances to objects around the vehicle is measured by transmitting and receiving sound waves, and having a neighborhood area in which distances to objects around the vehicle is not measured, the neighborhood area being closer to the distance measuring device than the detection area, the vehicle control device comprising:

acquisition circuitry, which, in operation, acquires the one or more detection times in the detection area;

estimated coordinate calculation circuitry, which, in operation, calculates estimated coordinates in the neighborhood area indicating an estimated position of an object in a case where the object is present in the neighborhood area, the estimated coordinates in the neighborhood area being calculated on the basis of the one or more detection times in the detection area; and vehicle control circuitry, which, in operation, controls brakes of the vehicle based on the estimated coordinates in the neighborhood area.

2. The vehicle control device according to claim 1, further comprising estimated straight line calculation circuitry, which, in operation, calculates an estimated straight line on the basis of the one or more detection times acquired by the acquisition circuitry, the estimated straight line being a line connecting positions of an object that change over time, wherein the estimated coordinate calculation circuitry calculates the estimated coordinates in the neighborhood area on the basis of the estimated straight line.

3. The vehicle control device according to claim 2, wherein the estimated coordinate calculation circuitry calculates, as the estimated coordinates in the neighborhood area, coordinates of a position at which a distance from the distance measuring device to the estimated straight line is shortest in the neighborhood area.

4. The vehicle control device according to claim 2, further comprising position information calculation circuitry, which, in operation, calculates position information indicating a position of the object on the basis of the one or more detection times acquired by the acquisition circuitry, wherein the estimated straight line calculation circuitry calculates the estimated straight line on the basis of the position information calculated by the position information calculation circuitry.

5. The vehicle control device according to claim 4, wherein, when the position information having been calculated by the position information calculation circuitry is a single set of positional coordinates indicating a single position, the estimated straight line calculation circuitry calculates, as the estimated straight line, a straight line that passes through the single set of the positional coordinates and is parallel to the vehicle.

6. The vehicle control device according to claim 4, wherein, when the position information is not calculated by the position information calculation circuitry and one detection time has been acquired by the acquisition circuitry, the estimated straight line calculation circuitry calculates, as the estimated straight line, a straight line that passes through positions closest to the vehicle and is parallel to the vehicle, the positions closest to the vehicle being included in a trajectory obtained on the basis of the one detection time, the trajectory connecting a plurality of positions where an object may be present.

7. The vehicle control device according to claim 4, wherein, when the position information is not calculated by the position information calculation circuitry and two detection times have been acquired by the acquisition circuitry, the estimated straight line calculation circuitry calculates, as the estimated straight line, a straight line that touches two trajectories each connecting a plurality of positions where an object may be present, the two trajectories corresponding one-to-one to the two detection times, the two trajectories each being obtained on the basis of a corresponding one of the two detection times.

8. The vehicle control device according to claim 6, wherein, when the position information is not calculated by the position information calculation circuitry and three detection times have been acquired by the acquisition circuitry, the estimated straight line calculation circuitry calculates a latest estimated straight line on the basis of a first straight line and a second straight line, the first straight line touching two trajectories each connecting a plurality of positions where an object may be present, one of the two trajectories being obtained on the basis of a latest detection time, the other one of the two trajectories being obtained on the basis of a detection time before the latest detection time, the second straight line indicating an estimated straight line calculated before the latest detection time is acquired.

9. The vehicle control device according to claim 7, wherein, when the position information is not calculated by the position information calculation circuitry and three detection times have been acquired by the acquisition circuitry, the estimated straight line calculation circuitry calculates a latest estimated straight line on the basis of a first straight line and a second straight line, the first straight line touching two trajectories each connecting a plurality of positions where an object may be present, one of the two trajectories being obtained on the basis of a latest detection time, the other one of the two trajectories being obtained on the basis of a detection time before the latest detection time, the second straight line indicating an estimated straight line calculated before the latest detection time is acquired.

10. The vehicle control device according to claim 2, wherein, when the calculated estimated coordinates are located on an outer side of the vehicle with respect to the neighborhood area, the estimated coordinate calculation circuitry corrects the calculated estimated coordinates with coordinates of a position closest to the estimated straight line in the neighborhood area.

11. The vehicle control device according to claim 10, further comprising neighborhood mode setting circuitry, which, in operation, sets a neighborhood mode as a control mode related to braking of the vehicle, the neighborhood mode being set when the estimated coordinates calculated by the estimated coordinate calculation circuitry are located on an inner side of the vehicle with respect to the neighborhood area, the neighborhood mode being a mode in which the vehicle is controlled to brake when an operation is performed to turn the vehicle in a direction that an object is present.

12. A system comprising:

a distance measuring device configured to be mounted on a vehicle, the distance measuring device having a detection area in which distances to objects around the vehicle is measured by transmitting and receiving sound waves and having a neighborhood area in which distances to objects around the vehicle is not measured, the neighborhood area being closer to the distance measuring device than the detection area; and a vehicle control device configured to control the vehicle on a basis of one or more detection times each representing a distance measured by the distance measuring device, the vehicle control device including:

acquisition circuitry, which, in operation, acquires the one or more detection times in the detection area;

estimated coordinate calculation circuitry, which, in operation, calculates estimated coordinates in the neighborhood area indicating an estimated position of an object in a case where the object is present in the neighborhood area, the estimated coordinates in the neighborhood area being calculated on the basis of the one or more detection times in the detection area; and vehicle control circuitry, which, in operation, controls brakes of the vehicle based on the estimated coordinates in the neighborhood area.

13. A vehicle control method performed by a vehicle control device serving to control a vehicle on a basis of one or more detection times each representing a distance measured by a distance measuring device configured to be mounted on the vehicle, the distance measuring device having a detection area in which distances to objects around the vehicle is measured by transmitting and receiving sound waves, and having a neighborhood area in which distances to objects around the vehicle is not measured, the neighborhood area being closer to the distance measuring device than the detection area, the vehicle control method comprising:

acquiring the one or more detection times in the detection area; and calculating estimated coordinates in the neighborhood area indicating an estimated position of an object in a case where the object is present in the neighborhood area, the estimated coordinates in the neighborhood area being calculated on the basis of the one or more detection times in the detection area; and controlling brakes of the vehicle based on the estimated coordinates in the neighborhood area.

\* \* \* \* \*